Dec. 19, 1950  R. E. FRUSHOUR  2,534,432
TOOL TURRET

Filed July 9, 1945  2 Sheets-Sheet 2

RUSSEL E. FRUSHOUR.
INVENTOR.

BY Oltsch & Knoblock
ATTORNEYS.

Patented Dec. 19, 1950

2,534,432

UNITED STATES PATENT OFFICE 2,534,432

TOOL TURRET

Russel E. Frushour, South Bend, Ind., assignor to South Bend Lathe Works, South Bend, Ind., a corporation of Indiana Application July 9, 1945, Serial No. 603,892

1 Claim. (Cl. 29—49)

This invention relates to improvement in tool turret. More particularly, the invention relates to a tool turret for use on a machine tool, such as a lathe, to mount a plurality of cutting tools for successive use thereof upon the work mounted in the machine.

The primary objects of the invention are to provide a device of this character which can be adjusted to different angular positions with high precision; to provide novel adjustment means which maintains the device in accurately centered position in all indexed or operative positions; to provide novel means having a three-point indexing arrangement associated with clamping means for firmly and positively seating the rotatable head of the turret centered upon its base; and to provide a device which is simple in construction and easy to operate.

Other objects will be apparent from the description, drawings and appended claim.

Figure 1:
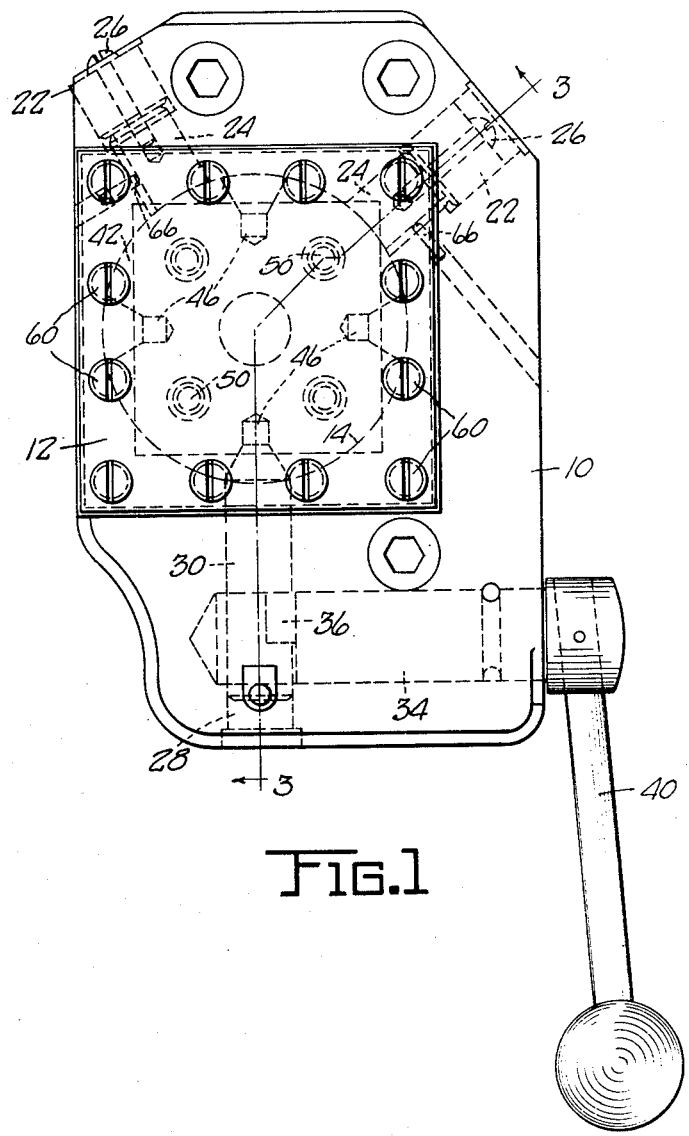
Fig. 1 is a top plan view of the device.

Referring to the drawings, which illustrate the preferred embodiment of the invention, the numeral 10 designates the base of the device which is of generally rectangular elongated shape and which mounts the rotatable turret head 12 thereon. Base 10 has a large cylindrical vertical opening 14 therethrough. The base 10 has a raised portion 16 around opening 14, the face of which is finished with high precision and forms the surface upon which turret head 12 is supported. A pair of spaced radial bores 18 are formed in base 10 at one end thereof, being located on opposite sides of the center line of the opening 14 which is parallel to the length of the base. The outer portion 20 of each bore is slightly larger than the inner portion and is screw threaded to receive a set screw 22. The inner portion of each bore 18 snugly receives a pin or plug 24 therein. A screw 26 extends axially through the screw 22 and into the pin 24 to secure the pin to screw 22 in firm end abutment.

Base 10 is provided with a third bore 28 extending longitudinally thereof and radially of opening 14. An elongated pin or plunger 30 fits snugly and slidably in said bore. A bore 32 extends transversely from and communicates with bore 28. A shaft 34 is journaled in bore 32 and has an eccentric 36 at its inner end which projects into bore 28 and fits within a notch 38 in plunger 30. A crank arm 40 is mounted on the outer projecting end of shaft 34.

Figure 3:
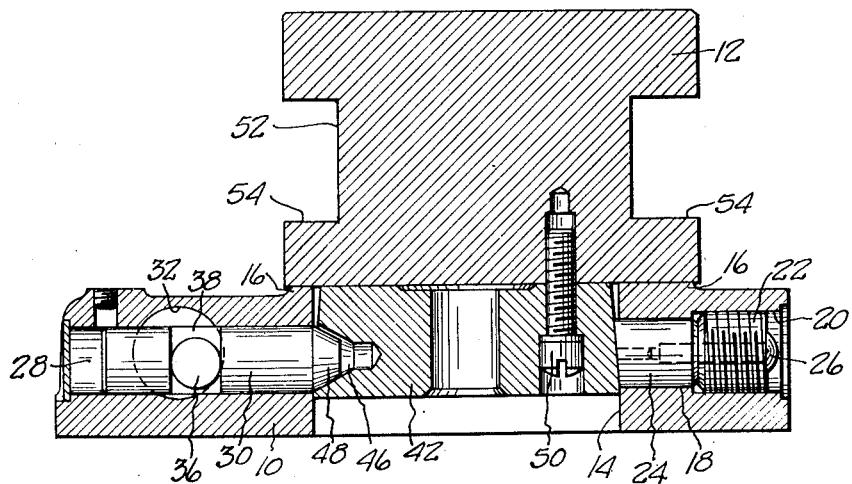
Fig. 3 is a vertical sectional view of the device taken on line 3—3 of Fig. 1.

A frusto-conical member 42 fits within the base opening 14. The large diameter portion of said member is positioned lowermost and has a rotatable fit in the opening. The upper surface of member 42 lies substantially flush with the turret head supporting surface of projection 16. Member 42 has a plurality of equispaced radial inwardly tapering recesses or sockets 46 formed therein, here illustrated as four in number. The plunger 30 has a conical inner end 48 adapted to seat snugly in a recess 46 aligned therewith, as shown in Fig. 3. The throw of eccentric 36 incident to manipulation of crank arm 40 is sufficient to retract the plunger end 48 from opening 14 to permit free rotation of member 42. The periphery of member 42 is engaged by the ends of pins 24 which project slightly from their receiving bores 18 and have their inner ends ground in conformity with the contour of the periphery of member 42. The member 42 is secured to the bottom of the turret head 12 by means of a plurality of screws 50, and is thereby held in the opening 14 in desired elevation. It will be observed in Fig. 3 that this elevation is such that the horizontal plane common to the axes of the tapered sockets 46 is slightly above the elevation of the axis of plunger 30. This difference is very slight, and has been exaggerated in Fig. 3 for purposes of illustration. It is sufficient, however, to impart a downwardly directed component or force upon the member 42 when plunger 30 is thrust into a socket 46, for the purpose of effecting a solid and firm seating engagement of the bottom surface of turret head 12 upon the upper surface of portion 16 of the base.

Figure 2:
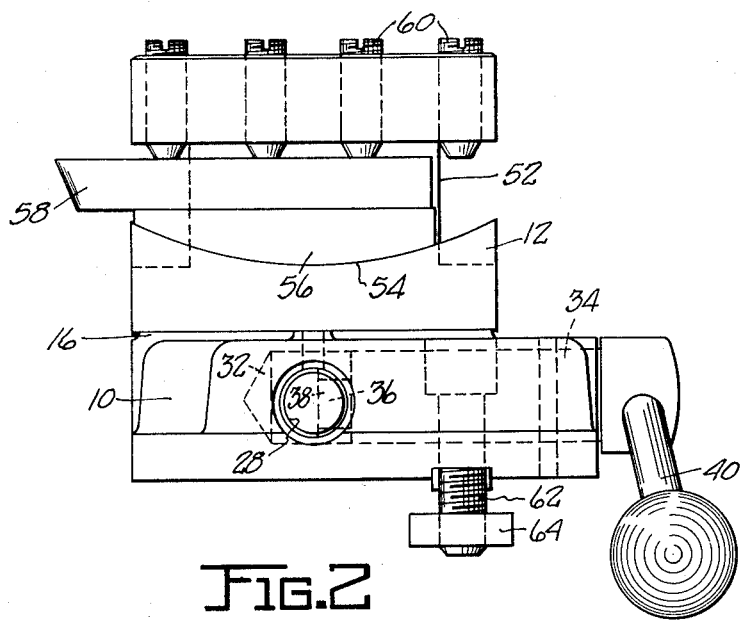
Fig. 2 is a view of the device in elevation.

The turret head 12 is of any suitable construction, having a number of sides equal to the number of sockets or recesses 46 in member 42. Each side of the head is arranged in predetermined angular relation to one of the sockets, so that each side is positioned in precise desired angular relation to the work at each adjustment of the head when locked by seating of plunger 30 in a socket 46. Stated differently, as each side is successively brought into working position, it bears the identical angular relation to the work that it bore in each previous working position. Each side of the turret has tool mounting means thereat. As illustrated, a horizontal extending groove 52 is formed in each side face, the lower wall 54 thereof being of longitudinally arcuate form as seen in Fig. 2. A gib 56 having a longitudinally arcuate side fits in each groove with its curved face bearing on groove wall 54. A tool 58 bears upon the gib and is clamped thereon by set screws 60. Suitable means for securing the device upon a support, for example the compound tool rest of a lathe, are secured to the base. Such means may comprise a bolt 62 mounting a head 64 adapted for reception in a T-slot of a tool rest (not shown) upon which the base rests, as is well understood in the art.

It will be observed that this construction accommodates in one mechanism indexing, clamping and centering means. Thus, the plunger 30 which acts as the indexing means when seated in a socket 46 in member 42 provides one point of a three-point centering device, the other two points of which are the pins 24. Inasmuch as the pins 24 are ground accurately to conform with the peripheral contour of member 42 and the end 48 of the plunger conforms in contour with the sockets 46, it will be apparent that in each of the possible settings of the turret head the member 42 will be centered precisely. In order to assure this result, the pins 24 are so positioned that the sockets 46 are spaced therefrom in indexing position as shown in Fig. 1. Also, in order to avoid any danger of interference with free rotation of member 42, the pins 24 are of slightly larger diameter than the mouths of sockets 46 so that the pins will not catch in the sockets. It is also desirable to provide means to prevent rotation of the pins 24 in their receiving sockets, which means may constitute set screws 66 threaded in suitable bores in the base as shown in dotted lines in Fig. 1.

The clamping function has been described above, and constitutes the application by the plunger head 48 of a downward clamping force at socket 46 of member 42 incident to the slight vertical off-set of the axis of plunger 30 below the plane of the axis of socket 46. The application of this downward force component urges the bottom face of the turret held into tight frictional face engagement with the top surface of base 10. In this connection, as pressure is applied radially inwardly to member 42 by plunger 30, the ends of pins 24 tend to cam the conical face portions of member 42 downwardly. Hence, the clamping action is uniform and equal on all radii of member 42. Consequently, the turret head is held solidly against vibration or chatter in use.

It will be observed that the device does not rely upon a journaled center shaft to connect the parts. Consequently, the reliance on a shaft journal for centering and positioning of parts, as has been customary heretofore, is avoided. The elimination of such a center shaft is one of the primary features and advantages of this device.

I claim:

A turret comprising a base having a vertical aperture and a pair of spaced abutments projecting into said aperture, a turret head bearing upon said base and having a depending portion freely rotatable in said aperture, said depending portion having a frusto-conical peripheral portion with its large diameter end lowermost and the inner end faces of said abutments conforming to the frusto-conical peripheral contour of said depending portion, and locking means carried by said base and including a plunger shiftable radially into said aperture on an axis displaced more than 90 degrees from both abutments and having a tapered end, said depending portion having a plurality of radial tapered indexing sockets adapted to receive the tapered end of said plunger, the axis of said plunger being located in a plane slightly below the horizontal plane in which the axes of said sockets lie.

RUSSEL E. FRUSHOUR.

REFERENCES CITED

The following references are of record in the file of this patent:

UNITED STATES PATENTS

| Number | Name | Date |
|---|---|---|
| 989,006 | Hanson | Apr. 11, 1911 |
| 1,425,804 | Steiner | Aug. 15, 1922 |
| 1,779,674 | Johnson | Oct. 28, 1930 |
| 2,144,486 | Erb | Jan. 17, 1939 |

FOREIGN PATENTS

| Number | Country | Date |
|---|---|---|
| 529,172 | France | Nov. 24, 1921 |